United States Patent
Zhang et al.

(10) Patent No.: US 11,048,983 B2
(45) Date of Patent: Jun. 29, 2021

(54) METHOD, TERMINAL, AND COMPUTER STORAGE MEDIUM FOR IMAGE CLASSIFICATION

(71) Applicant: Beijing Dajia Internet Information Technology Co., Ltd., Beijing (CN)

(72) Inventors: Zhiwei Zhang, Beijing (CN); Fan Yang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/932,599

(22) Filed: Jul. 17, 2020

(65) Prior Publication Data
US 2020/0356821 A1 Nov. 12, 2020

Related U.S. Application Data

(63) Continuation of application No. PCT/CN2018/122432, filed on Dec. 20, 2018.

(51) Int. Cl.
*G06K 9/00* (2006.01)
*G06K 9/62* (2006.01)
(Continued)

(52) U.S. Cl.
CPC .......... *G06K 9/6267* (2013.01); *G06K 9/344* (2013.01); *G06K 9/346* (2013.01); *G06K 9/348* (2013.01);
(Continued)

(58) Field of Classification Search
CPC .... G06K 9/6267; G06K 9/629; G06K 9/4638; G06K 9/344; G06K 9/348; G06K 9/346;
(Continued)

(56) References Cited

U.S. PATENT DOCUMENTS 9,484,022 B2* 11/2016 Gruenstein .......... G06N 3/0454
9,501,724 B1* 11/2016 Yang .......................... G06T 3/40
(Continued)

FOREIGN PATENT DOCUMENTS

CN 105760507 A 7/2016
CN 107145484 A 9/2017
(Continued)

OTHER PUBLICATIONS

Wegner et al., "Learning Aerial image segmentation from online maps"; IEEE; Nov. 11, 2017.*
(Continued)

*Primary Examiner* — Amir Alavi
(74) *Attorney, Agent, or Firm* — Burns & Levinson, LLP; Joseph M. Maraia

(57) ABSTRACT

Disclosed are a method, terminal and computer readable storage medium for image classification. The method includes: determining an image feature vector of an image based on a convolutional neural network, where the image comprises textual information; determining a text feature vector based on the textual information and an embedded network; determining an image-text feature vector by joining the image feature vector with the text feature vector; and determining a category of the image based on a result of a deep neural network, where the result is determined based on the image feature vector, the text feature vector and the image-text feature vector.

12 Claims, 4 Drawing Sheets

(51) Int. Cl.
*G06K 9/34* (2006.01)
*G06K 9/46* (2006.01)
*G06N 3/08* (2006.01)

(52) U.S. Cl.
CPC ........... *G06K 9/4638* (2013.01); *G06K 9/629* (2013.01); *G06N 3/08* (2013.01)

(58) Field of Classification Search
CPC .......... G06K 9/66; G06K 9/4628; G06K 9/32; G06K 9/2013; G06K 9/6415; G06K 9/6407; G06K 9/03; G06K 9/20; G06N 3/08
See application file for complete search history.

(56) References Cited

U.S. PATENT DOCUMENTS

| | | | | |
|---|---|---|---|---|
| 9,514,391 B2* | 12/2016 | Perronnin | ............ | G06K 9/6247 |
| 9,767,557 B1* | 9/2017 | Gulsun | .................. | G06N 3/084 |
| 9,830,526 B1* | 11/2017 | Lin | ........................ | G06N 3/084 |
| 10,068,171 B2* | 9/2018 | Wshah | ............... | G06K 9/00785 |
| 10,089,556 B1* | 10/2018 | Xu | ..................... | G06K 9/00771 |
| 10,095,950 B2* | 10/2018 | Krishnakumar | ... | G06K 9/00624 |
| 10,140,515 B1* | 11/2018 | Waldo | .................. | G06K 9/6273 |
| 10,185,893 B2* | 1/2019 | Townsend | ............ | G06K 9/6215 |
| 10,503,775 B1* | 12/2019 | Ranzinger | ............ | G06K 9/6202 |
| 10,706,545 B2* | 7/2020 | Laserson | ............... | G06T 7/0016 |
| 2017/0317983 A1 | 11/2017 | Kompalli | | |
| 2020/0356821 A1* | 11/2020 | Zhang | .................. | G06K 9/6267 |

FOREIGN PATENT DOCUMENTS

| | | |
|---|---|---|
| CN | 107392109 A | 11/2017 |
| CN | 108256549 A | 7/2018 |
| CN | 108399409 A | 8/2018 |
| WO | 2015/154206 A1 | 10/2015 |

OTHER PUBLICATIONS

Office Action from related Chinese Application No. 201810055063.5, 2019, with English translation.
Notification of Grant from related Chinese Application No. 201810055063.5, 2019, with English translation.
International Search Report from related PCT Application No. PCT/CN2018/122432, dated Mar. 19, 2019.

* cited by examiner

METHOD, TERMINAL, AND COMPUTER STORAGE MEDIUM FOR IMAGE CLASSIFICATION

This application is the continuation application of International Application No. PCT/CN2018/122432, filed on Dec, 20, 2018, which is based upon and claims priority to Chinese Patent Application No. 201810055063.5, filed in the China National Intellectual Property Administration on Jan. 19, 2018, the entire contents of which are incorporated herein by reference.

FIELD

The present application relates to the field of image processing technology, and in particular, to a method, terminal, and computer storage medium for image classification.

BACKGROUND

Deep learning has been widely applied in the processing of video image, voice recognition, natural language and other related fields. The convolutional neural network (CNN) is an important branch of the deep learning. Due to its superb fitting capacity and end-to-end global optimization capacity, it has greatly improved the precision of the prediction results obtained in the computer vision tasks such as target detection, classification, etc.

Image classification, as an import branch of image processing, is applied to various fields, such as short video, automatic transmission, image recognition, etc. The classification accuracy is a main indicator for measuring the image classification technology. Deep learning has been used for higher accuracy. However, the inventor finds that how to acquire more comprehensive information for the classification and further improve the classification accuracy is still a problem to be solved for those skilled in the art.

SUMMARY

The embodiments of the present application provide a method, terminal and computer readable storage medium for image classification.

According to an embodiment of the present application, a method for image classification is provided. The method includes: determining an image feature vector of an image based on a convolutional neural network, where the image comprises textual information; determining a text feature vector based on the textual information and an embedded network; determining an image-text feature vector by joining the image feature vector with the text feature vector; determining a first classification result vector corresponding to the image feature vector, a second classification result vector corresponding to the text feature vector, and a third classification result vector corresponding to the image-text feature vector, based on a deep neural network; determining a target result vector by weighting and summing the first classification result vector, the second classification result vector and the third classification result vector; and determining a category of the image based on the target result vector.

According to an embodiment of the present application, a terminal of image classification is provided. The terminal includes: a memory, a processor and a program that is stored on the memory and runs on the processor. The program, when executed by the processor, implements the steps of: determining an image feature vector of an image based on a convolutional neural network, where the image comprises textual information; determining a text feature vector based on the textual information and an embedded network; determining an image-text feature vector by joining the image feature vector with the text feature vector; determining a first classification result vector corresponding to the image feature vector, a second classification result vector corresponding to the text feature vector, and a third classification result vector corresponding to the image-text feature vector, based on a deep neural network; determining a target result vector by weighting and summing the first classification result vector, the second classification result vector and the third classification result vector; and determining a category of the image based on the target result vector.

According to an embodiment of the present application, a computer readable storage medium for image classification is provided. The computer readable storage medium stores a program thereon, and the program, when executed by a processor, implements the steps of: determining an image feature vector of an image based on a convolutional neural network, where the image comprises textual information; determining a text feature vector based on the textual information and an embedded network; determining an image-text feature vector by joining the image feature vector with the text feature vector; determining a first classification result vector corresponding to the image feature vector, a second classification result vector corresponding to the text feature vector, and a third classification result vector corresponding to the image-text feature vector, based on a deep neural network; determining a target result vector by weighting and summing the first classification result vector, the second classification result vector and the third classification result vector; and determining a category of the image based on the target result vector.

According to an embodiment of the present application, a computer program product is provided, which is configured to implement the steps of any image classification method in the present application when being runned.

BRIEF DESCRIPTION OF THE DRAWINGS

In order to illustrate the embodiments of the present application and the technical solutions in the prior art more clearly, the accompanying figures which need to be used in describing the embodiments and the prior art will be introduced below briefly. Obviously the accompanying figures described below are some embodiments of the present application, and other accompanying figures can also be obtained by those ordinary skilled in the art according to these accompanying figures without creative labor.

DETAILED DESCRIPTION OF THE EMBODIMENTS

In order to make the objects, technical solutions and advantages of the present application clearer, the present application will further be illustrated below in details by reference to the drawings and the embodiments. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

First Embodiment

Figure 1:
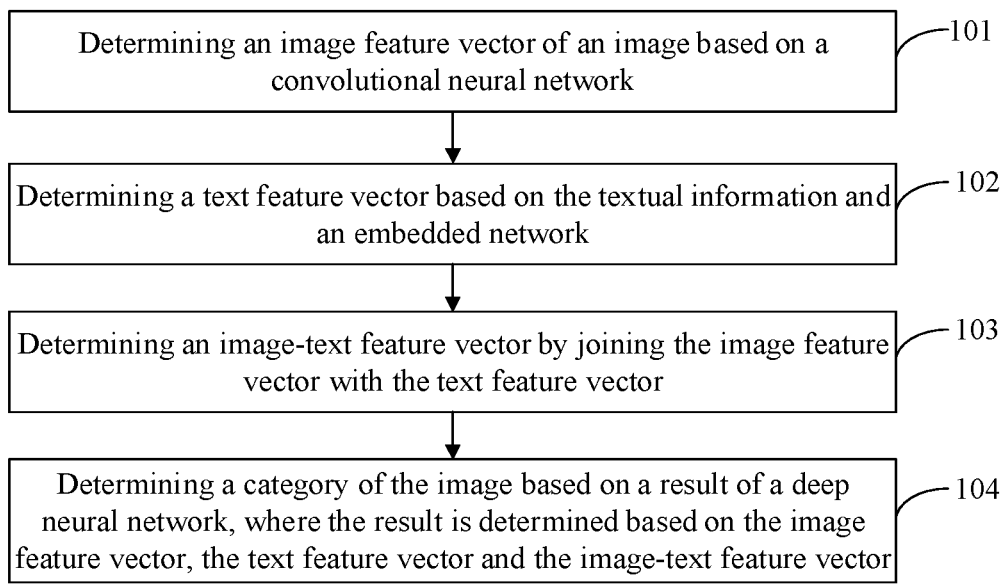
FIG. 1 is a flow chart of a method of image classification according to a first embodiment of the present application.

FIG. 1 illustrates a flowchart of the method of image classification according to the first embodiment of the present application. As shown in FIG. 1, the method includes the following steps.

Step 101: determining an image feature vector of an image based on a convolutional neural network.

The image described in the application includes textual information for description. In some embodiments, the textual information may be added by the user after uploading the image, or contained in the image.

In some embodiments, the image may be a single frame image in a video, or may be a multimedia image. An image feature vector can be determined based on a processing result of the convolution layer or pooling layer in the convolutional neural network. The image feature vector contains multiple points, and each point corresponds to a feature map and a weight value. For the specific processing method of determining the feature vector of the image based on the convolutional neural network, the reference may be made to the related art, which is not specifically limited in the embodiments of the present application.

Step 102: determining a text feature vector based on the textual information and an embedded network.

In some embodiments, when the textual information is processed, the word segmentation is performed on the textual information at first to obtain multiple segmented words. A description vector corresponding to each segmented word is determined based on the preset text feature set, and finally the description vectors corresponding to all the segmented words are weighted and averaged in the same dimensions to obtain the text feature vector. The text feature vector contains multiple points, and each point corresponds to a text feature in the text feature set.

It should be noted that step 102 is not limited to being executed after step 101, but can also be executed in parallel with step 101 or before step 101.

Step 103: determining an image-text feature vector by joining the image feature vector with the text feature vector.

The image feature vector and the text feature vector respectively involve multiple dimensions, and each dimension corresponds to a point on the vector. Each dimension in the image-text feature vector can present both the image feature and the text feature. For example, the image feature vector involves ten dimensions, i.e., ten points, and the text feature vector involves ten dimensions, then the image-text feature vector involves twenty dimensions.

Step 104: determining a category of the image based on the result of a deep neural network, where the result is determined based on the image feature vector, the text feature vector and the image-text feature vector.

The deep neural network determines the probability values corresponding to the respective points in the image feature vector, text feature vector and image-text feature vector respectively, to obtain three classification result vectors. The three classification result vectors are weighted and averaged to obtain a target result vector. From the target result vector, the feature label corresponding to the point with the highest probability value is determined as the label of the image, and the category to which the image belongs may be determined according to the label. In some embodiments, the label may also be directly used as the category.

In the method for image classification according to the embodiment of the present application, the convolutional neural network is taken as the master network for image feature extraction, and the embedded network is taken as the master network for text feature extraction. The image feature vector is determined based on the convolutional neural network, and the text feature vector is determined based on the embedded network. The image feature vector and the text feature vector are joined to obtain the image-text feature vector. The weights of the image with different labels are determined and thus the category of the image is determined based on a result of a deep network, where the result is determined based on the image feature vector, the text feature vector and the image-text feature vector. As such, since the textual information of the image is considered for image classification, the classification accuracy can be improved.

Second Embodiment

Figure 2:
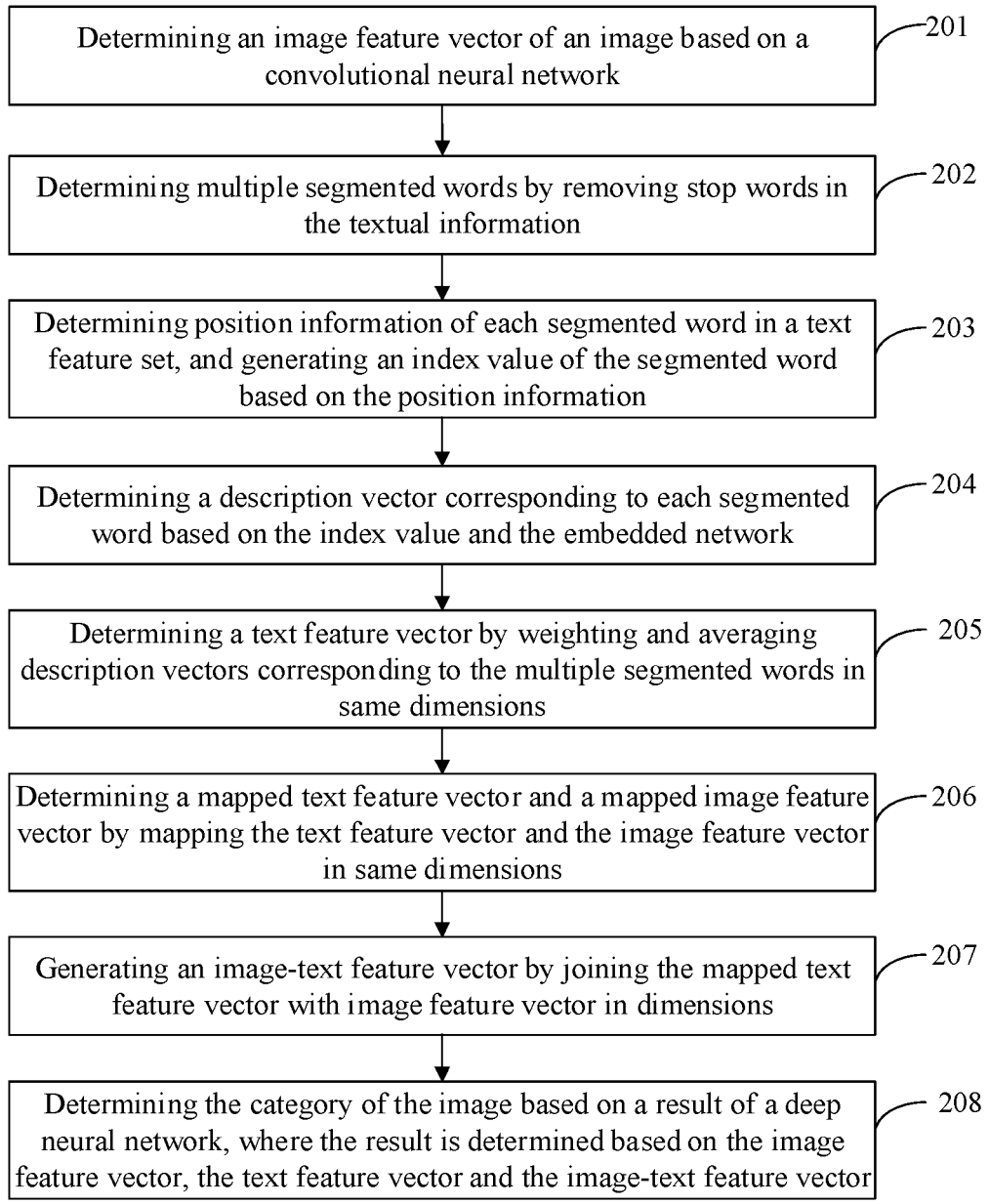
FIG. 2 is a flow chart of a method of image classification according to a second embodiment of the present application.

FIG. 2 illustrates a flowchart of a method of image classification of the second embodiment of the present application. As shown in FIG. 2, the method includes the following steps.

Step 201: determining an image feature vector of an image based on a convolutional neural network.

The image described in the application includes the textual information. In some embodiments, the textual information may be added by the user after uploading the image, or contained in the image.

For the specific way to determine the image feature vector, the reference may be made to the related art, which is not specifically limited in the embodiments of the present application.

Step 202: determining multiple segmented words by removing stop words from the textual information.

In some embodiments, a stop word list is preset in the system. When the textual information is processed, each phrase/word in the textual information is matched with the stop word list. In response to that the match is successful, the phrase/word is determined as a stop word and removed from the textual information. As such, all the stop words in the textual information can be removed to obtain segmented words. It should be noted that, the stop words are words with no actual meaning, and the stop word list may be set by those skilled in the art based on the actual demands, which is not specifically limited in the embodiments of the present application.

Step 203: determining position information of each segmented word in a text feature set, and generating an index value of the segmented word based on the position information.

The text feature set is obtained by training the textual information corresponding to the sample images. In some embodiments, a way to train the textual information is as follows.

Firstly, the respective sample images are acquired.

The sample images may or may not have the textual information for description. The quantity and selection of sample images may be set by those skilled in the art according to the actual demands, which is not specifically limited in the embodiments of the present application. The larger the number of sample images, the more comprehensive the text features contained in the text feature set obtained by training Secondly, a description set is determined based on each sample image. Where the description set is null in response to that the sample image has no textual information, and the description set contains segmented words in response to that the sample image has textual information. Here the segmented words are words except the stop words in the textual information.

Then a text feature subset is determined based on the description set. In some embodiments, The text feature subset is extracted from the description set based on the preset label system, where the text feature subset corresponding to a single sample image may be represented by $S_i$, and the empty set is represented by null.

Finally, the text feature subsets corresponding to the respective sample images are combined to obtain the text feature set.

In some embodiments, the text feature set is represented as $$S = \text{null} + \bigcup_{i \in X} S_i,$$

where X represents all the trained sample images.

For example, when a user uploads a food recipe, he also enters the textual information "Sweet and Sour Fillet Course, Friends Who Like It Give a Like". A processing procedure is as follows.

In some embodiments, the description set corresponding to a single sample image may be represented by $S_u$. The description set determined based on a result of word segmentation on the text information may be as follows:

$S_u$={Sweet and Sour Fillet, Course, Like, Friend, Give a Like}

In this sample of food recipe, "Sweet and Sour Fillet" and "Course" can be used as description labels, thus the two description labels are extracted from the description set to form a text feature subset as:

$S_i$={Sweet and Sour Fillet, Course}

Step 204: determining a description vector corresponding to each segmented word based on the index value and the embedded network.

The text feature set contains multiple text features, each text feature corresponds to a position in the text feature set, and each position corresponds to an index value. In some embodiments, the position number may be used as the index value. After the multiple segmented words are extracted, each segmented word is taken as a text feature. The position of each segmented word in the text feature set is determined, and the index value corresponding to each segmented word is further determined based on the correspondence between positions and index values.

In some embodiments, the index value is input into the embedded network, and the embedded network determines the description vector $W_i$ corresponding to each segmented word based on the index value.

Step 205: determining a text feature vector by weighting and averaging description vectors corresponding to the multiple segmented words in same dimensions.

Multiple segmented words are obtained by word segmentation on the textual information of the image to be classified. For each segmented word, whether the text feature set obtained in advance by training contains this segmented word is determined. In response to that the text set contains the segmented word, the description vector corresponding to this segmented word will be further determined. In response to that the text set does not contain the segmented word, it is determined that this segmented word has no corresponding description vector. That is, a description vector is generated for a segmented word in response to that the segmented word is a description label; and conversely, no description vector is generated for this segmented word in response to that the segmented word is not a description label.

The weights corresponding to the respective segmented words may be the same or different. If the weights are the same, the description vectors corresponding to all the segmented words may be weighted and averaged in the same dimensions by the following formula to obtain the text feature vector.

$$F_{text} = \frac{1}{N} \sum_{i=1}^{N} W_i$$

where $F_{text}$ is the text feature vector, and N is the quantity of description labels in the textual information contained in the current image.

Step 206: determining a mapped text feature vector and a mapped image feature vector by mapping the text feature vector and the image feature vector in same dimensions.

Since the image feature vector output by the convolutional neural network and the text feature vector output by the recurrent neural network are not in the same space, that is, they have different dimensions, there is a need to perform the spatial mapping on the two feature vectors so that they are mapped to the same space, to make them have same dimensions. In some embodiments, the full connection may be used to spatially map the features in the text feature vector and the image feature vector.

Step 207: generating an image-text feature vector by joining the mapped text feature vector with the mapped image feature vector dimensionally.

For example, the mapped text feature vector contains five dimensions of 1-5, and the mapped image feature vector contains five dimensions of 1-5. The first dimension of the image feature vector may be joined behind the fifth dimension of the text feature vector to generate an image-text feature vector containing ten dimensions, where each dimension in the image-text feature vector corresponds to a feature label.

Step 208: determining the category of the image based on the result of a deep neural network, where the result is determined based on the image feature vector, the text feature vector and the image-text feature vector.

In some embodiments, firstly a first classification result vector corresponding to the image feature vector, a second classification result vector corresponding to the text feature vector, and a third classification result vector corresponding to the image-text feature vector may be determined. Each classification result vector contains multiple points, where each point corresponds to a feature label and a probability value.

Secondly, the first classification result vector, the second classification result vector and the third classification result vector are weighted and summed to obtain a target result vector.

In some embodiments, the target result vector P may be obtained by the following formula:

$$P = W_{text}P_{text} + W_{image}P_{image} + W_{text\text{-}image}P_{text\text{-}image}$$

where $W_{image}$, $W_{text}$ and $W_{text\text{-}image}$ are the weights of the first classification result vector, the second classification result vector and the third classification result vector respectively; and $P_{image}$, $P_{text}$ and $P_{text\text{-}image}$ are the first classification result vector, the second classification result vector and the third classification result vector respectively.

Finally, the category is determined based on the target result vector.

The feature label corresponding to the image is determined based on the target result vector. Here the feature label corresponding to the image corresponds to the point with the highest probability value in the target feature vector, and the category is determined based on the feature label.

In the method for image classification according to the embodiment of the present application, the convolutional neural network is taken as the master network for image feature extraction, and the embedded network is taken as the master network for text feature extraction. The image feature vector is determined based on the convolutional neural network, and the text feature vector is determined based on the embedded network. The image feature vector and the text feature vector are joined to obtain the image-text feature vector. The weights of the image with different labels are determined and thus the category of the image is determined based on a result of a deep network, where the result is determined based on the image feature vector, the text feature vector and the image-text feature vector. As such, since the textual information of the image is considered for image classification, the classification accuracy can be improved.

Third Embodiment

Figure 3:
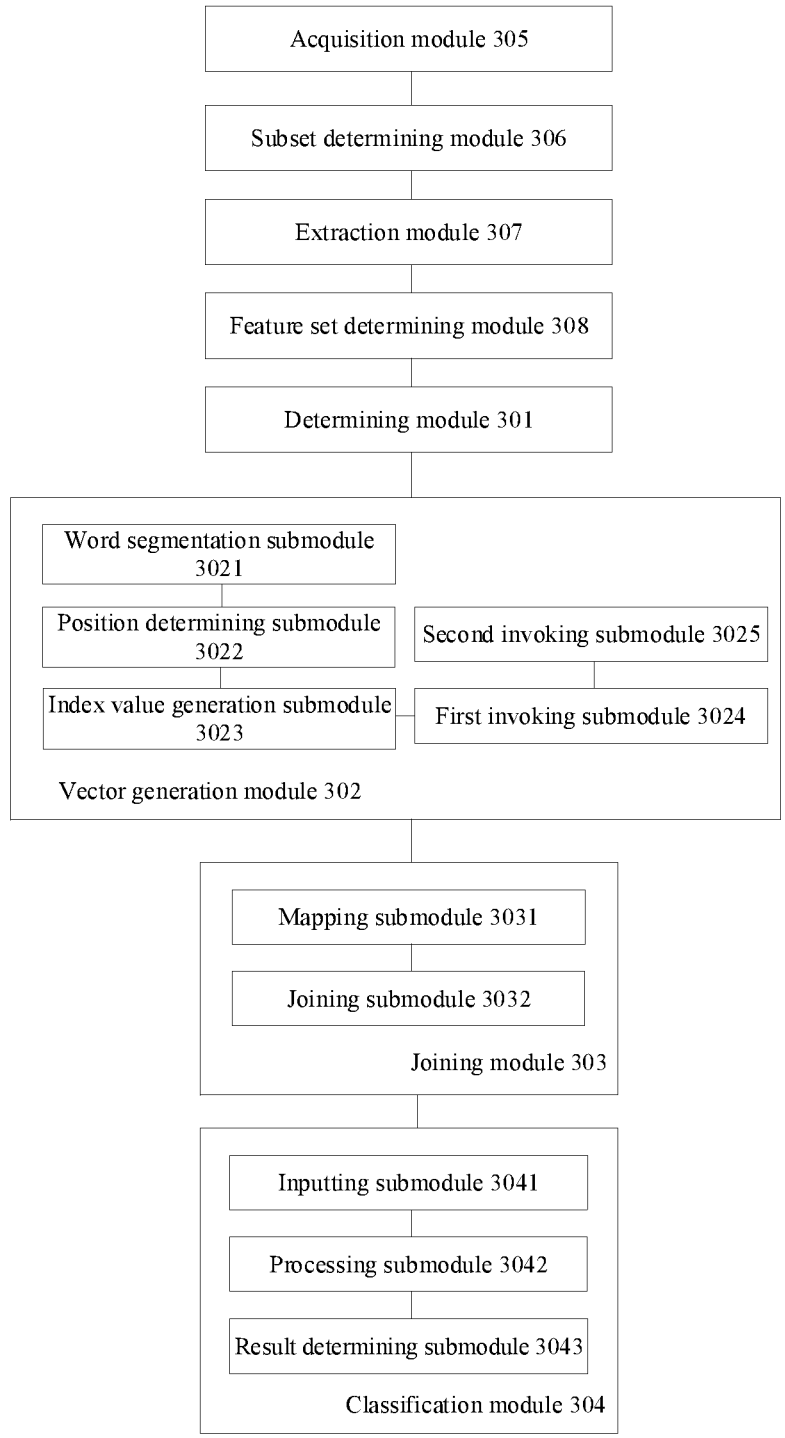
FIG. 3 is a structural block diagram of a device of image classification according to a third embodiment of the present application.

FIG. 3 illustrates a structural block diagram of a device of image classification according to the third embodiment of the present application. As shown in FIG. 3, the device includes:

a determining module 301 configured to determine an image feature vector of an image based on a convolutional neural network, where the image comprises textual information;

a vector generation module 302 configured to determine a text feature vector based on the textual information and an embedded network;

a joining module 303 configured to determine an image-text feature vector by joining the image feature vector with the text feature vector; and a classification module 304 configured to determine a category of the image based on a result of a deep neural network, where the result is determined based on the image feature vector, the text feature vector and the image-text feature vector.

In some embodiments, the vector generation module 302 may include:

a word segmentation submodule 3021 configured to multiple segmented words by removing stop words in the textual information;

a position determining submodule 3022 configured to determine position information of each segmented word in a text feature set;

an index value generation submodule 3023 configured to generate an index value of the segmented word based on the position information;

a first invoking submodule 3024 configured to determine a description vector corresponding to each segmented word based on the index value and the embedded network; and a second invoking submodule 3025 configured to determine a text feature vector by weighting and averaging description vectors corresponding to the multiple segmented words in same dimensions.

In some embodiments, the joining module 303 may include:

a mapping submodule 3031 configured to determine a mapped text feature vector and a mapped image feature vector by mapping the text feature vector and the image feature vector in same dimensions; and a joining submodule 3032 configured to generate an image-text feature vector by joining the mapped text feature vector with the mapped image feature vector dimensionally.

In some embodiments, the device may further include:

an acquisition module 305 configured to acquire sample images;

a subset determining module 306 configured to determine a description set based on each sample image, wherein the description set is null in response to that the sample image has no textual information, and the description set comprises segmented words in response to that the sample image has textual information, wherein the segmented words comprises words except stop words in the textual information;

an extraction module 307 configured to determine a text feature subset based on the description set; and a feature set determining module 308 configured to determine a text feature set by combining text feature subsets.

In some embodiments, the classification module 304 may include:

an inputting submodule 3041 configured to determine a first classification result vector corresponding to the image feature vector, a second classification result vector corresponding to the text feature vector, and a third classification result vector corresponding to the image-text feature vector;

a processing submodule 3042 configured to determine a target result vector by weighting and summing the first classification result vector, the second classification result vector and the third classification result vector; and a result determining submodule 3043 configured to determine the category of the image based on the target result vector.

The device of image classification according to the embodiment of the present application is used to implement the corresponding method of image classification in the foregoing first and second embodiments, and has the beneficial effects corresponding to the method embodiments, which will not be repeated here.

Fourth Embodiment

Figure 4:
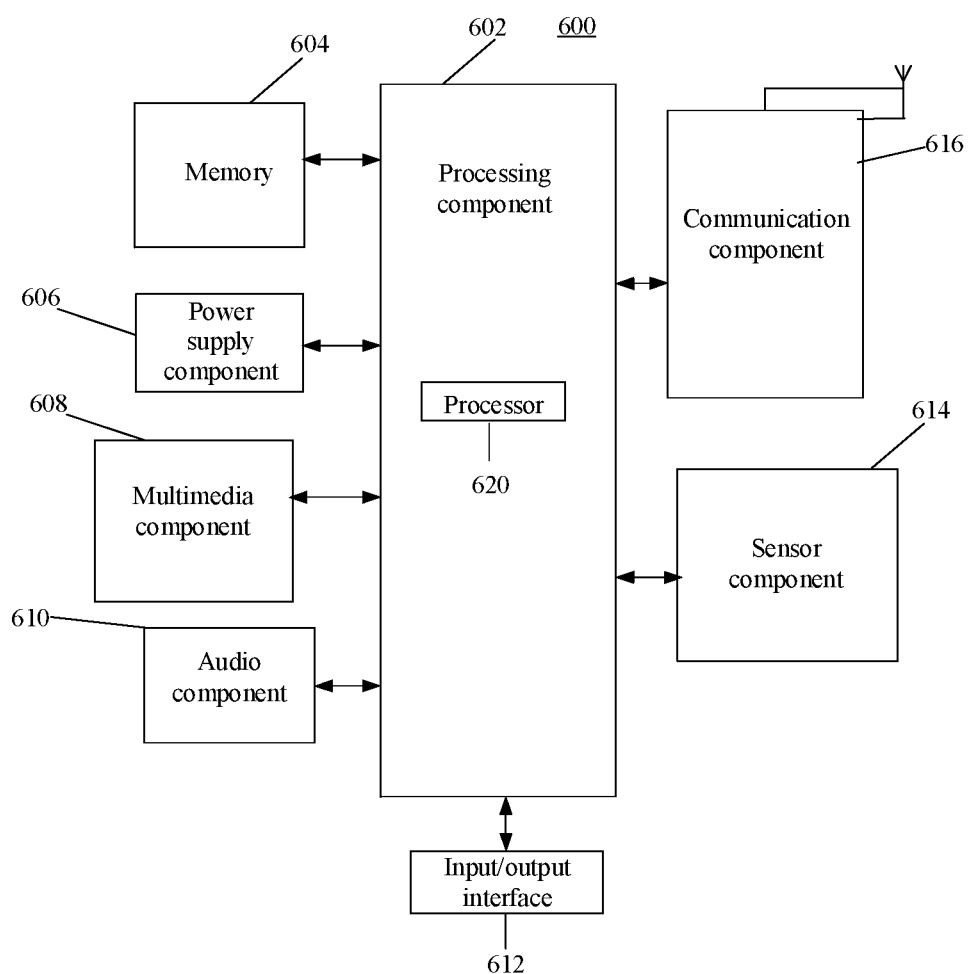
FIG. 4 is a structural block diagram of a terminal according to a fourth embodiment of the present application.

FIG. 4 illustrates a structural block diagram of a terminal for image classification according to the fourth embodiment of the present application. As shown in FIG. 4, the terminal may include: a memory, a processor and a program that is stored on the memory and can run on the processor, where the program, when executed by the processor, implements the steps of any method of image classification in the present application.

In some embodiments, the terminal 600 may be a mobile phone, computer, digital broadcasting terminal, message transceiver, game console, tablet device, medical device, fitness device, personal digital assistant, or the like.

In some embodiments, as shown in FIG. 4, the terminal 600 may include one or more of a processing component 602, a memory 604, a power supply component 606, a multimedia component 608, an audio component 610, an input/output (I/O) interface 612, a sensor component 614, and a communication component 616.

The processing component 602 generally controls the overall operations of the device 600, such as operations associated with display, phone call, data communication, camera operation, and recording operation. The processing component 602 may include one or more processors 620 to execute instructions to complete all or a part of the steps of the above method. In addition, the processing component 602 may include one or more modules to facilitate the interactions between the processing component 602 and other components. For example, the processing component 602 may include a multimedia module to facilitate the interactions between the multimedia component 608 and the processing component 602.

The memory 604 is configured to store various types of data to support the operations of the terminal 600. Examples of the data include instructions of any application program or method operated on the terminal 600, contact person data, phone book data, messages, pictures, videos, and the like. The memory 604 may be implemented by any type of volatile or nonvolatile storage device or a combination thereof, such as Static Random Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

The power supply component 606 provides power for various components of the terminal 600. The power supply component 606 may include a power management system, one or more power supplies, and other components associated with generating, managing and distributing the power for the terminal 600.

The multimedia component 608 includes a screen of an output interface provided between the terminal 600 and the user. In some embodiments, the screen may include a Liquid Crystal Display (LCD) and a Touch Panel (TP). If the screen includes a touch panel, the screen may be implemented as a touch screen to receive input signals from the user. The touch panel includes one or more touch sensors to sense the touching, the sliding, and the gestures on the touch panel. The touch sensor may not only sense the boundary of the touching or sliding operation, but also detect the duration and pressure related to the touching or sliding operation. In some embodiments, the multimedia component 608 includes a front camera and/or a rear camera. When the terminal 600 is in the operation mode such as shooting mode or video mode, the front camera and/or the rear camera may receive the external multimedia data. Each of the front camera and rear camera may be a fixed optical lens system or have the focal length and the optical zoom capability.

The audio component 610 is configured to output and/or input audio signals. For example, the audio component 610 includes a microphone (MIC). When the terminal 600 is in the operation mode such as call mode, recording mode and voice recognition mode, the microphone is configured to receive the external audio signals. The received audio signals may be further stored in the memory 604 or transmitted via the communication component 616. In some embodiments, the audio component 610 further includes a speaker for outputting the audio signals.

The I/O interface 612 provides an interface between the processing component 602 and a peripheral interface module, where the above peripheral interface module may be a keyboard, a click wheel, buttons or the like. These buttons may include but not limited to: home button, volume button, start button, and lock button.

The sensor component 614 includes one or more sensors for providing the terminal 600 with the state assessments in various aspects. For example, the sensor component 614 may detect the opening/closing state of the terminal 600, and the relative positioning of the components (for example, the display and keypad of the terminal 600). The sensor component 614 may further detect the position change of the terminal 600 or a component of the terminal 600, the presence or absence of contact of the user with the terminal 600, the orientation or acceleration/deceleration of the device 600, and the temperature change of the terminal 600. The sensor component 614 may include a proximity sensor configured to detect the presence of nearby objects with no physical contact. The sensor component 614 may further include a light sensor, such as CMOS or CCD image sensor, for use in the imaging applications. In some embodiments, the sensor component 614 may further include an acceleration sensor, a gyro sensor, a magnetic sensor, a pressure sensor, or a temperature sensor.

The communication component 616 is configured to facilitate the wired or wireless communications between the terminal 600 and other devices. The terminal 600 may access a wireless network based on a communication standard, such as WiFi, 2G or 3G, or a combination thereof. In an exemplary embodiment, the communication component 616 receives the broadcast signal or broadcast related information from an external broadcast management system via a broadcast channel. In an exemplary embodiment, the communication component 616 further includes a Near Field Communication (NFC) module to facilitate the short-range communications. For example, the NFC module may be implemented based on the Radio Frequency IDentification (RFID) technology, Infrared Data Association (IrDA) technology, Ultra-WideBand (UWB) technology, Bluetooth (BT) technology and other technologies.

In an exemplary embodiment, the terminal 600 may be implemented by one or more Application Specific Integrated Circuits (ASICs), Digital Signal Processors (DSPs), Digital Signal Processing Devices (DSPD5), Programmable Logic Devices (PLDs), Field Programmable Gate Arrays (FPGAs), controllers, microcontrollers, microprocessors or other electronic elements to perform a method for image classification including:

determining an image feature vector of an image based on a convolutional neural network, where the image comprises textual information;

determining a text feature vector based on the textual information and an embedded network;

determining an image-text feature vector by joining the image feature vector with the text feature vector; and determining a category of the image based on a result of a deep neural network, where the result is determined based on the image feature vector, the text feature vector and the image-text feature vector.

In some embodiments, the step of determining a text feature vector based on the textual information and an embedded network includes:

determining multiple segmented words by removing stop words in the textual information;

determining position information of each segmented word in a text feature set; generating an index value of the segmented word based on the position information;

determining a description vector corresponding to each segmented word based on the index value and the embedded network; and determining a text feature vector by weighting and averaging description vectors corresponding to the multiple segmented words in same dimensions.

In some embodiments, the step of determining an image-text feature vector by joining the image feature vector with the text feature vector includes:

determining a mapped text feature vector and a mapped image feature vector by mapping the text feature vector and the image feature vector in same dimensions; and generating an image-text feature vector by joining the mapped text feature vector with the mapped image feature vector dimensionally.

In some embodiments, the program, when executed by the processor, further implements steps of:

acquiring sample images;

determining a description set based on each sample image, where the description set is null in response to that the sample image has no textual information, and the description set comprises segmented words in response to that the sample image has textual information, wherein the segmented words comprises words except stop words in the textual information;

determining a text feature subset based on the description set; and determining a text feature set by combining text feature subsets.

In some embodiments, the step of determining a category of the image includes:

determining a first classification result vector corresponding to the image feature vector, a second classification result vector corresponding to the text feature vector, and a third classification result vector corresponding to the image-text feature vector;

determining a target result vector by weighting and summing the first classification result vector, the second classification result vector and the third classification result vector; and determining the category of the image based on the target result vector.

In an exemplary embodiment, a non-transitory computer readable storage medium including instructions is provided. For example, the memory 604 including instructions. Where the above instructions can be executed by the processor 620 of the terminal 600 to complete the above method. For example, the non-transitory computer readable storage medium may be ROM, Random Access Memory (RAM), CD-ROM, magnetic tape, floppy disk, optical data storage device, or the like. When the instructions in the storage medium are executed by the processor of the terminal, the terminal can perform the steps of any method in the present application.

In the terminal according to the embodiments of the present application, the convolutional neural network is taken as the master network for image feature extraction, and the embedded network is taken as the master network for text feature extraction. The image feature vector is determined based on the convolutional neural network, and the text feature vector is determined based on the embedded network. The image feature vector and the text feature vector are joined to obtain the image-text feature vector. The weights of the image with different labels are determined and thus the category of the image is determined based on a result of a deep network, where the result is determined based on the image feature vector, the text feature vector and the image-text feature vector. As such, since the textual information of the image is considered for image classification, the classification accuracy can be improved.

For the device embodiments, they are substantially similar to the method embodiments, so the description thereof is relatively simple, and the related parts may refer to the partial illustration of the method embodiments.

In an exemplary embodiment, a computer program product is further provided, where the computer program product is used to execute the steps of any method of image classification in the present application when being runned.

For the embodiments of the computer program product, they are substantially similar to the method embodiments, so the description thereof is relatively simple, and the related parts may refer to the partial illustration of the method embodiments.

The solution of image classification provided here is not inherently related to any particular computer, virtual system or other device. Various general-purpose systems may also be used with the teaching based on this. From the above description, it is obvious to construct the structure required by the system with the solution of the present application. Furthermore, the present application does not direct at any specific programming language. It should be understood that various programming languages may be used to implement the content of the present application described herein, and the above description of the specific language is intended to disclose the best embodiments of the present application.

A lot of specific details are illustrated in the specification provided here. However, it can be understood that the embodiments of the present application may be practiced without these specific details. In some instances, the well-known methods, structures and techniques are not shown in detail, so as not to obscure the understanding of the specification.

Similarly, it should be understood that in order to simplify the disclosure and help to understand one or more of various application aspects, various features of the present application are sometimes grouped together into a single embodiment, figure or its description in the above description of the exemplary embodiments of the present application. However, the disclosed method should not be interpreted as reflecting the following intention: the claimed application claims more features than those explicitly recited in each claim. More precisely, as reflected by the claims, the application aspects lie in being less than all the features of the single embodiment disclosed above. Therefore, the claims following a specific embodiment are hereby explicitly incorporated into the specific embodiment, wherein each claim itself serves as a separate embodiment of the present application.

It can be understood by those skilled in the art that the modules in the device in the embodiment may be adaptively changed and set in one or more devices different from this embodiment. The modules or units or components in the embodiments may be combined into one module or unit or component, and furthermore, they may be divided into a plurality of submodules or subunits or subcomponents. Except that at least some of such features and/or processes or units are mutually exclusive, all the features disclosed in the specification (including the accompanying claims, abstract and drawings) and all the processes or units of any method or device so disclosed may be combined in any combination. Unless explicitly stated otherwise, each feature disclosed in the specification (including the accompanying claims, abstract and drawings) may be replaced by an alternative feature providing the same, equivalent or similar purpose.

Furthermore, as can be understood by those skilled in the art, although some embodiments herein include some features but not other features included in other embodiments, the combinations of features of different embodiments mean that they are within the scope of the present application and form different embodiments. For example, in the claims, any one of the claimed embodiments may be used in any combination.

Each component embodiment of the present application may be implemented by hardware, or implemented by a software module running on one or more processors, or implemented by a combination thereof. It should be understood by those skilled in the art that a microprocessor or a Digital Signal Processor (DSP) may be used in practice to implement some or all functions of some or all components in the image classification scheme according to the embodiments of the present application. The present application may also be implemented as a device or device program (e.g., computer program and computer program product) for performing a part or all of the method described herein. Such a program for implementing the present application may be stored on a computer readable medium, or may be in the form of one or more signals. Such a signal may be downloaded from an Internet website, or provided on a carrier signal, or provided in any other form.

It should be noted that the above-mentioned embodiments illustrate the present application rather than limit the present application, and those skilled in the art can design alternative embodiments without departing from the scope of the appended claims. In the claims, any reference signs between parentheses should not be constructed as limitations on the claims. The word "contain" does not exclude the presence of elements or steps not listed in the claims. The word "a" or "one" before element does not exclude the presence of multiple such elements. The present application may be realized by means of hardware including several different elements and by means of a suitably programmed computer. In the unit claims reciting several devices, several of these devices may be embodied specifically by the same hardware item. The use of the words such as "first", "second", and "third" does not indicate any order. These words may be interpreted as names.

What is claimed is:

1. A method for image classification, comprising:
    determining an image feature vector of an image based on a convolutional neural network, wherein the image comprises textual information;
    determining a text feature vector based on the textual information and an embedded network;
    determining an image-text feature vector by joining the image feature vector with the text feature vector;
    determining a first classification result vector corresponding to the image feature vector, a second classification result vector corresponding to the text feature vector, and a third classification result vector corresponding to the image-text feature vector, based on a deep neural network;
    determining a target result vector by weighting and summing the first classification result vector, the second classification result vector and the third classification result vector; and
    determining a category of the image based on the target result vector.

2. The method according to claim 1, wherein said that determining a text feature vector based on the textual information and an embedded network comprises:
    determining multiple segmented words by removing stop words in the textual information;
    determining position information of each segmented word in a text feature set;
    generating an index value of the segmented word based on the position information;
    determining a description vector corresponding to each segmented word based on the index value and the embedded network; and
    determining a text feature vector by weighting and averaging description vectors corresponding to the multiple segmented words in same dimensions.

3. The method according to claim 1, wherein, said determining an image-text feature vector by joining the image feature vector with the text feature vector comprises:
    determining a mapped text feature vector and a mapped image feature vector by mapping the text feature vector and the image feature vector in same dimensions; and
    generating an image-text feature vector by joining the mapped text feature vector with the mapped image feature vector dimensionally.

4. The method according to claim 1, wherein, the method further comprises:
    acquiring sample images;
    determining a description set based on each sample image, wherein the description set is null in response to that the sample image has no textual information, and the description set comprises segmented words in response to that the sample image has textual information, wherein the segmented words comprises words except stop words in the textual information;
    determining a text feature subset based on the description set; and
    determining a text feature set by combining text feature subsets.

5. A terminal, comprising:
    a memory;
    a processor; and
    a program for image classification that is stored on the memory and runs on the processor;
    wherein the program, when executed by the processor, implements steps of:
        determining an image feature vector of an image based on a convolutional neural network, wherein the image comprises textual information;
        determining a text feature vector based on the textual information and an embedded network;
        determining an image-text feature vector by joining the image feature vector with the text feature vector;
        determining a first classification result vector corresponding to the image feature vector, a second classification result vector corresponding to the text feature vector, and
    a third classification result vector corresponding to the image-text feature vector, based on a deep neural network;
    determining a target result vector by weighting and summing the first classification result vector, the second classification result vector and the third classification result vector; and
    determining a category of the image based on the target result vector.

6. The terminal according to claim 5, wherein said that determining a text feature vector based on the textual information and an embedded network comprises:
   determining multiple segmented words by removing stop words in the textual information;
   determining position information of each segmented word in a text feature set;
   generating an index value of the segmented word based on the position information;
   determining a description vector corresponding to each segmented word based on the index value and the embedded network; and
   determining a text feature vector by weighting and averaging description vectors corresponding to the multiple segmented words in same dimensions.

7. The terminal according to claim 5, wherein, said determining an image-text feature vector by joining the image feature vector with the text feature vector comprises:
   determining a mapped text feature vector and a mapped image feature vector by mapping the text feature vector and the image feature vector in same dimensions; and
   generating an image-text feature vector by joining the mapped text feature vector with the mapped image feature vector dimensionally.

8. The terminal according to claim 5, wherein, the program, when executed by the processor, further implements steps of:
   acquiring sample images;
   determining a description set based on each sample image, wherein the description set is null in response to that the sample image has no textual information, and the description set comprises segmented words in response to that the sample image has textual information, wherein the segmented words comprises words except stop words in the textual information;
   determining a text feature subset based on the description set; and
   determining a text feature set by combining text feature subsets.

9. A non-transitory computer readable storage medium, wherein, the computer readable storage medium stores a program for image classification thereon, wherein the program, when executed by a processor, implements steps of:
   determining an image feature vector of an image based on a convolutional neural network, wherein the image comprises textual information;
   determining a text feature vector based on the textual information and an embedded network;
   determining an image-text feature vector by joining the image feature vector with the text feature vector;
   determining a first classification result vector corresponding to the image feature vector, a second classification result vector corresponding to the text feature vector, and a third classification result vector corresponding to the image-text feature vector, based on a deep neural network;
   determining a target result vector by weighting and summing the first classification result vector, the second classification result vector and the third classification result vector; and
   determining a category of the image based on the target result vector.

10. The non-transitory computer readable storage medium according to claim 9, wherein said that determining a text feature vector based on the textual information and an embedded network comprises:
    determining multiple segmented words by removing stop words in the textual information;
    determining position information of each segmented word in a text feature set;
    generating an index value of the segmented word based on the position information;
    determining a description vector corresponding to each segmented word based on the index value and the embedded network; and
    determining a text feature vector by weighting and averaging description vectors corresponding to the multiple segmented words in same dimensions.

11. The non-transitory computer readable storage medium according to claim 9, wherein, said determining an image-text feature vector by joining the image feature vector with the text feature vector comprises:
    determining a mapped text feature vector and a mapped image feature vector by mapping the text feature vector and the image feature vector in same dimensions; and
    generating an image-text feature vector by joining the mapped text feature vector with the mapped image feature vector dimensionally.

12. The non-transitory computer readable storage medium according to claim 9, wherein, the program, when executed by the processor, further implements steps of:
    acquiring sample images;
    determining a description set based on each sample image, wherein the description set is null in response to that the sample image has no textual information, and the description set comprises segmented words in response to that the sample image has textual information, wherein the segmented words comprises words except stop words in the textual information;
    determining a text feature subset based on the description set; and
    determining a text feature set by combining text feature subsets.

* * * * *